United States Patent [19]

Katakura et al.

[11] Patent Number: 5,757,467
[45] Date of Patent: May 26, 1998

[54] METHOD AND APPARATUS FOR PREPARING INDEX PRINTS WITH IDENTICALLY ORIENTED VERTICAL IMAGES AND WITH IDENTICALLY ORIENTED LATERAL IMAGES

[75] Inventors: Kazuhiko Katakura; Hiroaki Nakamura; Masahiro Shiina. all of Kanagawa, Japan

[73] Assignee: Fuji Photo Film Co., Ltd.. Kanagawa, Japan

[21] Appl. No.: 686,029

[22] Filed: Jul. 25, 1996

[30] Foreign Application Priority Data

Jul. 28, 1995 [JP] Japan ................... 7-192901

[51] Int. Cl.[6] ................ G03B 27/52; G03B 27/44
[52] U.S. Cl. ................ 355/40; 355/41; 355/42; 355/43; 355/54
[58] Field of Search ................ 355/40, 41, 42, 355/43, 46, 54

[56] References Cited

U.S. PATENT DOCUMENTS 5,130,745  7/1992  Cloutier et al. .................. 355/40
5,184,227  2/1993  Foley .................. 358/302
5,343,269  8/1994  Yamamoto et al. .................. 355/43

FOREIGN PATENT DOCUMENTS 61-122639  6/1986  Japan .................. G03B 27/32

*Primary Examiner*—R. L. Moses
*Assistant Examiner*—Shival Virmani
*Attorney, Agent, or Firm*—Sughrue, Mion, Zinn, Macpeak & Seas, PLLC

[57] ABSTRACT

When negative images on a negative film are stored in a negative image storing unit, an index print image is constructed by an index constructing section in an image processing unit on the basis of the inputted images, which is displayed as a positive image on a monitor through a display instructing section. Images having different top-to-bottom directions in each of lateral and vertical image groups are indicated by key operation on a keyboard connected to the image processing unit with respect to the index print image displayed on the monitor. The direction of the indicated image is changed by a direction changing section in the image processing unit, and then the image is displayed on the monitor again. An index print image after changing the direction is displayed in an index printing section (on a liquid crystal panel). Thus an index print is prepared.

7 Claims, 8 Drawing Sheets

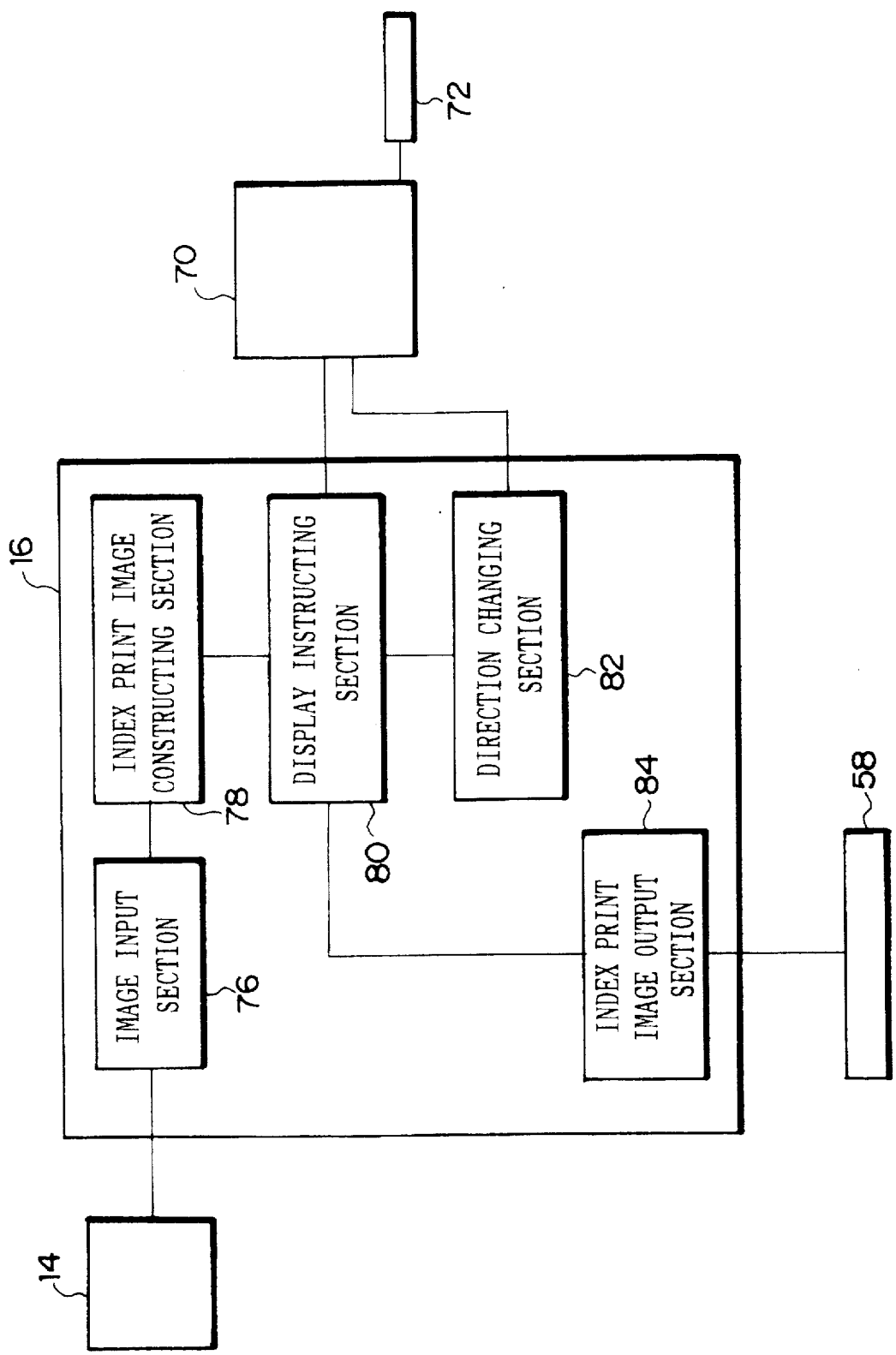

METHOD AND APPARATUS FOR PREPARING INDEX PRINTS WITH IDENTICALLY ORIENTED VERTICAL IMAGES AND WITH IDENTICALLY ORIENTED LATERAL IMAGES

BACKGROUND OF THE INVENTION

1. Field of the Invention

The present invention relates to an apparatus for preparing index prints, and a method for preparing index prints.

2. Description of the Related Art

An index print has been hitherto known, in which image frames are arranged in a matrix and printed in a reduced size in order to readily search for what photographs are recorded on a roll of developed film (for example, Japanese Patent Application Laid-Open (JP-A) No. 61-122639).

An index print is prepared such that all image frames recorded on a photographic film are read by using, for example, a scanner (image reader) to construct an index print image which is displayed in an index printing section by using a color CRT or a liquid crystal panel so that the index print image is printed before or after a group of prints of the image frames.

However, some images recorded on a photographic film are arranged upside down depending on the direction of a camera upon photographing operation. In the case of lateral images (images whose vertical direction corresponds to the vertical direction of the frame), a camera is used upside down extremely scarcely. Accordingly, top-to-bottom directions (or bottom-to-top directions) of almost all lateral images are coincident in many cases. However, in the case of vertical images (images whose vertical direction corresponds to the horizontal direction of the frame), whether the photographing operation is performed with a right side or a left side of a camera directed upwardly is determined by a habit of a photographer. Accordingly, top-to-bottom directions are sometimes not coincident. In such a situation, if an index print is prepared while maintaining the orientation during the photographing operation, top-to-bottom directions are not coincident when the index print is viewed to judge images. Accordingly, the index print should be viewed by rotating it, which is laborious and not preferable.

On the other hand, an index print is prepared by using only printed images except for images not printed due to, for example, under-exposure. However, even image frames, which have not been printed as unnecessary frames, may be sometimes those desired by a photographer to be printed. In such a case, the reason why the printing was not performed is unknown, which is inconvenient if more copies are printed in another time. As described above, information on all image frames is not recorded on the index print. Additionally, it is difficult to conveniently collate the contents of a photographic film with the contents of prints.

The present invention has been made taking the aforementioned facts into consideration, an object of which is to provide a method for preparing index prints and an apparatus for preparing index prints in which the contents of photographic film can be conveniently collate with the contents of prints.

SUMMARY OF THE INVENTION

A first aspect of the present invention is a method for preparing index prints by arranging image frames recorded on a photographic film into a matrix form to display on a display means and exposing the displayed image onto a photosensitive material, wherein image frames recorded on the photographic film are classified into vertical and lateral images, orientations of each vertical image frame are made coincident, and orientations of each lateral image frame are made coincident.

According to the first aspect of the present invention, the images are classified into vertical and lateral image groups so that top-to-bottom directions of the vertical images are made coincident, and top-to-bottom directions of the lateral images are made coincident.

Therefore, even when an index print is constructed with vertical images and lateral images, it is possible to prepare the index print in which top-to-bottom directions of the vertical images are aligned in one direction, and top-to-bottom directions of the lateral images are aligned in one direction. Thus preparation of copies of an image or preparation of prints can be easily performed on the basis of the index print.

A second aspect of the present invention is an apparatus for preparing index prints by arranging image frames recorded on a photographic film into a matrix form to display on an image display means and exposing the displayed image onto a photosensitive material, said apparatus comprising: image storing means for reading and storing image information on image frames on the photographic film; index print constructing means for constructing an index print image on the basis of the image information stored in the image storing means; a monitor for temporarily displaying the index print image constructed by the index print constructing means; direction indicating means for indicating a direction of each image frame displayed on the monitor upon preparation of the index print; and control means for controlling display of the images on the image display means on the basis of an indication made by the direction indicating means.

According to the second aspect of the present invention, the images on the photographic film are stored by the image storing means while maintaining their directions. The index print image is constructed by the index print constructing means by using a predetermined number of the stored images, which is temporarily displayed on the monitor so that the direction is indicated by the direction indicating means. Accordingly, for any image on the photographic film, the image is temporarily displayed on the monitor before preparing the index print so that the direction is indicated by the direction indicating means after confirmation of an image frame by visual inspection. Thus it is possible to prepare the index print comprising the images having desired directions.

A third aspect of the present invention is a method for preparing index prints by arranging image frames recorded on a photographic film into a matrix form and exposing the matrix image onto a photosensitive material, wherein the print information including at least the presence or absence of respective print is recorded on each image frame in the index print.

According to the third aspect of the present invention, the index print is prepared, on which the image information on the all image frame areas on the photographic film, and the print information including at least the presence or absence of the print corresponding to each of the image frame areas are recorded. Accordingly, the image information and the print information are recorded for every image frame on the obtained index print. Thus the image information can be easily collated with the print information.

A fourth aspect of the present invention is a method according to the third aspect of the present invention, wherein the print information is recorded on a magnetic recording layer provided on the photographic film, and the print information is recorded on each image frame in the index print by reading the print information from the magnetic recording layer.

According to the fourth aspect of the present invention, the print information is recorded on the magnetic recording layer, which is read and recorded corresponding to each of the images. Therefore, more detailed print information on each of the image frames can be recorded corresponding to each of the image frames.

BRIEF DESCRIPTION OF THE DRAWINGS

FIG. 2 shows an arrangement of an image processing unit for performing image processing.

PREFERRED EMBODIMENTS
FIRST EMBODIMENT

A first embodiment of the present invention will be described in detail below with reference to the drawings.

Figure 1:
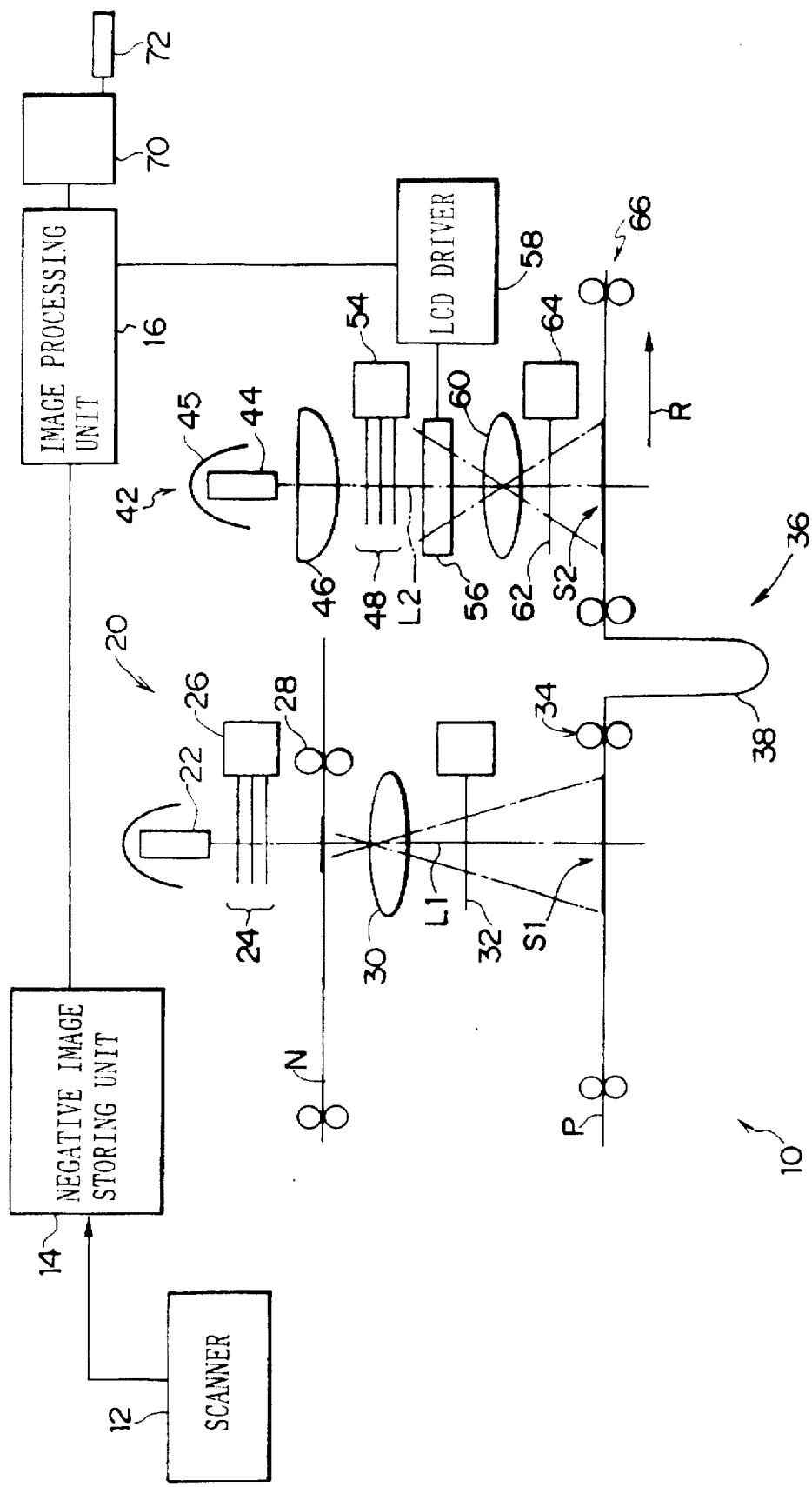
FIG. 1 shows a schematic illustration depicting an outlined arrangement of an image printing apparatus according to a first embodiment of the present invention.

As shown in FIG. 1, an image printing apparatus 10 is provided with a negative image storing unit 14 having a storage capacity of a degree capable of storing image information recorded on several packages (several rolls) of negative films N, a scanner 12, connected to the negative image storing unit 14, for reading image data of respective frames recorded on a negative film, transmitting the image data to the negative image storing unit 14, and setting exposure correction amounts for the respective frames on the basis of the image data of the respective frames so that their values are transmitted to a controller, and an image processing unit 16, connected to the negative image storing unit 14, for performing predetermined processing with respect to images inputted from the negative image storing unit 14.

The image printing apparatus 10 includes two printing sections. Namely, the image printing apparatus 10 includes a main printing section 20 for printing the images of the respective frames on a color photographic paper P exposed therewith, and an index printing section 42 for printing an index print image on the color photographic paper P exposed therewith, the index print image including the images of the respective frames arranged in a matrix. The main printing section 20 is arranged on an upstream side in a transport direction for the color photographic paper P indicated by an arrow R in FIG. 1, and the index printing section 42 is arranged on a downstream side in the transport direction.

The main printing section 20 is provided with a lamp 22 for radiating an exposure light beam, and a light modulating filter 24 comprising a combination of three filters of C (cyan), M (magenta), and Y (yellow) arranged insertably with respect to an optical path for exposure. The insertion of the respective filters of the light modulating filter 24 is corrected by an unillustrated controller on the basis of the exposure correction amount of each of the frames described above. The respective filters are inserted into the optical path by a filter driving unit 26 in conformity with corrected amounts of filter insertion.

The light beam passed through the light modulating filter 24 is transmitted through one frame image on the negative film N positioned by negative film transport rollers 28 at a printing position relative to an optical axis L1 as a center. After that, the light beam passes through a projection lens 30 and a black shutter 32. Thus a portion of the color photographic paper P corresponding to an exposure stage S1 interposed and positioned by photographic paper transport rollers 34 is irradiated with the light beam for a predetermined period of time. Accordingly, the respective frame images recorded on the negative film N are printed on the color photographic paper P exposed therewith in the main printing section 20.

A reservoir section 36, for absorbing a difference in speed of printing exposure processes between the main printing section 20 and the index printing section 42, is provided in a transport passage for the color photographic paper P between the exposure stage S1 of the main printing section 20 and an exposure stage S2 of the index printing section 42. The color photographic paper P forms a free loop at the reservoir section 36. In this embodiment, for example, the main printing section 20 is set to have a printing cycle of 300 msec, and the index printing section 42 is set to have a printing cycle of 3 sec.

The index printing section 42 is provided with a lamp 44 to serve as a light source for printing exposure. The index printing section 42 further comprises a condenser lens 46, a color separation filter 48, a liquid crystal panel 56, a projection lens 60, and a black shutter 62 arranged in this order from an upstream side along an optical axis of an exposure light beam radiated from the lamp 44. A reflector 45 to serve as a reflecting plate is arranged just over the lamp 44.

The condenser lens 46 has a function to convert the exposure light beam radiated from the lamp 44 into a parallel luminous flux. The color separation filter 48 comprises three filters of R (red) filter, G (green) filter, and B (blue) filter. The color separation filter 48 is connected to a filter driving unit 54 so that the three filters are successively inserted into a position to intercept an exposure optical path by means of a driving force exerted by the filter driving unit 54.

The liquid crystal panel 56 includes a large number of regularly arrayed pixels (for example, about 510,000 pixels) capable of displaying, on its display plane, a white color, a black color, and intermediate colors between them by using an electric means.

A liquid crystal panel driver 58 receives, through the image processing unit 16, image information corresponding to several packages temporarily stored in the negative image storing unit 14. Index print image data obtained by arranging frame images in accordance with a predetermined rule are formed for each of the packages. After that, an image, which corresponds to image data for a predetermined number of frames, for example, 10 frames (corresponding to 2 rows) included in the formed index image data corresponding to one package, can be formed on the liquid crystal panel 56. Further, an image, which corresponds to only image data for each of color components of R color, G color, and B color included in the image data corresponding to the 2 rows described above, can be also formed on the liquid crystal panel 56. In the foregoing, the image to be formed on the liquid crystal panel 56 is an image corresponding to the 10 frames (corresponding to the 2 rows) because it is intended to ensure a resolution of about 200 to 300 dpi.

The image formed on the liquid crystal panel 56 and projected by the exposure light beam is subjected to image formation by the projection lens 60 on the exposure stage S2 at a predetermined magnification. After the printing exposure for the index image corresponding to the 2 rows has been completed, the black shutter 62 is inserted into the optical axis L2 to intercept the exposure light beam in accordance with a signal from a black shutter driver 64. The black shutter 62 is retracted from the optical axis L2 when the exposure light beam is not intercepted.

Photographic paper transport rollers 66 are provided so that the color photographic paper P is interposed, positioned, and transported. The photographic paper transport rollers 66 are connected to an unillustrated transport motor. The driving force of the transport motor is transmitted to the photographic paper transport rollers 66. The amount of transport driven by the transport motor is set to be a predetermined amount by an unillustrated controller.

A monitor 70 and a keyboard 72 are connected to the image processing unit 16. Each of the image frames, stored in the negative image storing unit 14 and displayed on the liquid crystal panel 56 as the index print image to be printed, is previously displayed as a positive image on the monitor 70. An operator operates the keyboard 72 while viewing the display on the monitor 70. Thus the operator can instruct a treatment for a specified image frame as described later.

Therefore, each of the images on the negative film N is printed on the color photographic paper P by the lamp 22, while it is read by the scanner 12, stored in the negative image storing unit 14, and sent to the image processing unit 16. Data for each image sent to the image processing unit 16 are subjected to predetermined processing as described later, thereafter displayed as the index print image on the liquid crystal panel 56, and printed on the color photographic paper P by the lamp 44.

Next, a process for adjusting top-to-bottom directions conducted by the image processing unit 16 will be described with reference to FIGS. 2 and 3.

As shown in FIG. 2, the image processing unit 16 includes an image input section 76 for inputting images of respective image frames recorded on the negative film N from the negative image storing unit 14, and an index constructing section 78 connected thereto for constructing an index print image from inputted images.

The images on the negative film N read by the scanner 12 are inputted into the image input section 76 through the negative image storing unit 14 while maintaining directions upon reading. Accordingly, the inputted images include lateral and vertical images existing in a mixed manner, and include images having different top-to-bottom directions even when they have one of the lateral and vertical directions.

The index constructing section 78 connected to the image input section 76 collects a predetermined number of inputted images, and arranges them in a matrix to construct an index print image. At this time, images for constructing the index print image are arranged in one desired direction selected from the lateral and vertical directions in the index print image. Accordingly, some images included in each of lateral and vertical image groups may have different top-to-bottom directions.

The index constructing section 78 is connected to a display instructing section 80. The display instructing section 80 is connected to the monitor 70 so that it makes instruction to display the index print image constructed by the index constructing section 78 as a positive image on the monitor 70.

Figure 3A:
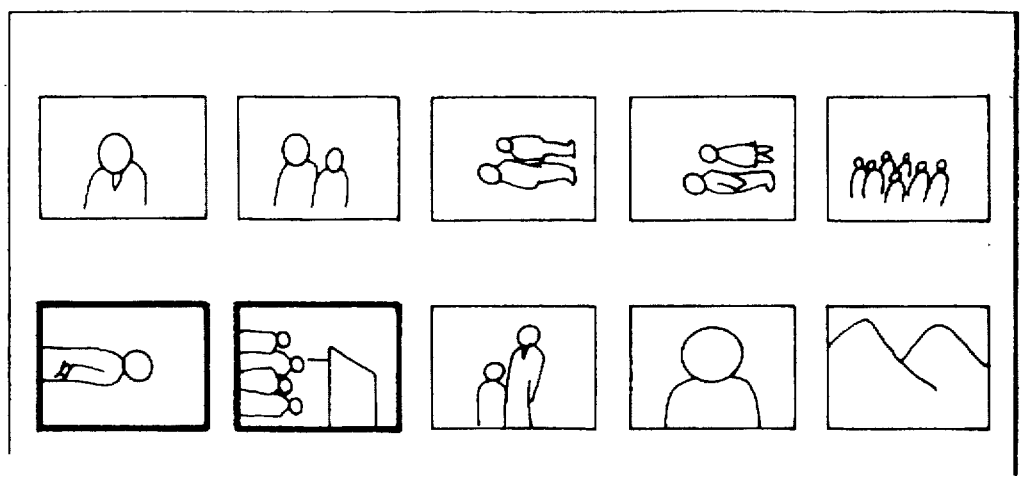
FIGS. 3A and 3B show an example of an index print image according to the first embodiment of the present invention.

Therefore, as shown in FIG. 3A, each of the images on the index print image initially constructed by the index print constructing section 78 such that the image recorded on the negative film N is incorporated as it is without changing the direction thereof, providing the image including images having different top-to-bottom directions even when the images are identically directed (lateral or vertical).

With reference to FIG. 3A, for example, third and fourth vertical images in an upper row and first and second vertical images in a lower row are equally vertical images, however, they have different top-to-bottom directions. When they are designated by means of key operation on the keyboard 72, designated frames are identified, as shown in FIG. 3A, with thickened frame window on the monitor 70.

As shown in FIG. 2, the keyboard 72 is connected to the monitor 70. Images for which their top-to-bottom directions are intended to be changed can be designated from the group of images which constitute the index print image displayed on the display image plane of the monitor 70. The keyboard 72 is provided with unillustrated cursor keys with which a cursor is moved, and an unillustrated execution key is effected so that images subjected to change in their top-to-bottom directions are designated.

A direction changing section 82, which is connected to the display instructing section 80 in the image processing unit 16, is connected to the monitor 70. The direction changing section 82 specifies an image designated by movement of the cursor keys and operation of the execution key, and changes a top-to-bottom direction of the image so that the designated image is changed to have a desired direction.

Figure 3B:
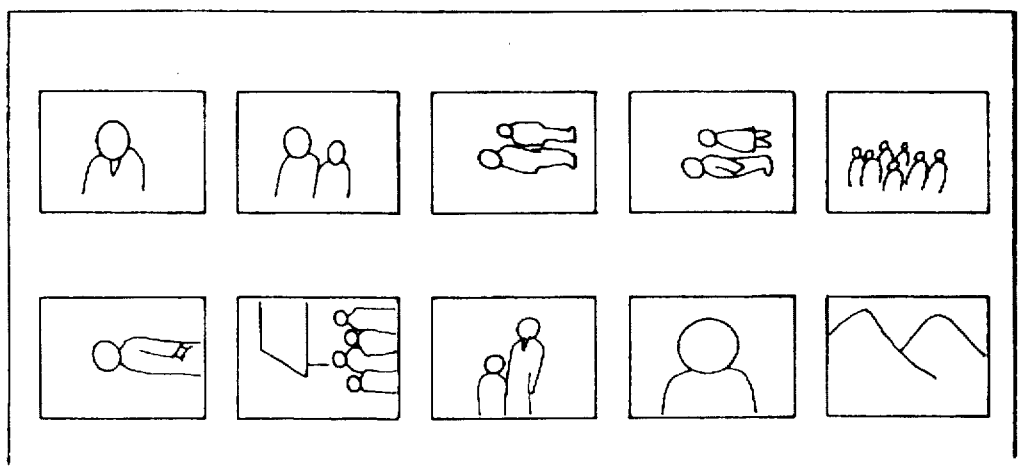

An index print image, which has been subjected to the process for changing the top-to-bottom direction by the direction changing section 82, is displayed on the monitor 70 again by the display instruction section 80. At this time, the index print image displayed on the monitor 70 is an image in which each of the vertical and lateral images has an aligned top-to-bottom direction as shown in FIG. 3B. The vertical images use a right side in FIG. 3 as their bottom sides, and the lateral images use a lower side in FIG. 3 as their bottom sides.

The display instructing section 80 is connected to an index print image output section 84. The index print image displayed on the monitor 70 through the display instructing section 80 is outputted from the image processing unit 16 through the index print image output section 84 to the liquid crystal panel driver 58.

Accordingly, when an index print image is constructed by using a group of images in which their top-to-bottom directions are not unified in each of the vertical and lateral directions, the top-to-bottom directions can be unified for each of the images to construct the index print image, and thus an index print can be prepared.

Therefore, when the negative images on the negative film N are stored in the negative image storing unit 14, the process is executed in the image processing unit 16. Namely, the index pint image is constructed by the index constructing section 78 on the basis of the inputted images, which is displayed as a positive image on the monitor 70 through the display instructing section 80. As for the index print image displayed on the monitor 70, images having different top-to-bottom directions included in each of lateral and vertical image groups are indicated by key operation on the keyboard 72 connected to the image processing unit 16 through the monitor 70. The directions of the indicated images are changed by the direction changing section 82 in the image processing unit 16, and the images are displayed on the monitor 70 again. The index print image after the correction of the direction is outputted from the index print image output section 84, which is displayed on the liquid crystal panel 56 through the liquid crystal panel driver 58 in the index printing section 42 to prepare the index print.

Next, the operation of the first embodiment will be described.

When the roll of negative film N is set to the image printing apparatus 10, all images in image frame areas on the negative film N corresponding to one package are successively stored in the negative image storing unit 14 through the scanner 12, and they are subjected to a predetermined process described later in the image processing unit 16, while being arranged in a matrix to construct and accumulate the index print image corresponding to one package.

After reading and accumulation of the images are completed, and the predetermined process is executed, the index print image is outputted from the index print image output section 84 through the liquid crystal driver 58, and displayed on a display plane on the liquid crystal panel 56 in the index printing section 42.

The index print image is divided into image rows capable of being displayed on the previously set display plane on the liquid crystal panel 56 to form a display pattern, which is displayed on the liquid crystal panel 56 by using the display pattern. Thus a plurality of image rows are simultaneously printed and exposed.

On the other hand, in the main printing section 20 located on the side upstream from the index printing section 42 in the transport direction for the color photographic paper P, only images corresponding to image frames judged to prepare prints, included in the images in the image frames on the negative film N, are successively printed on the color photographic paper P which is the same as the color photographic paper P on which the index print image is printed in the index printing section 42.

Figure 4:
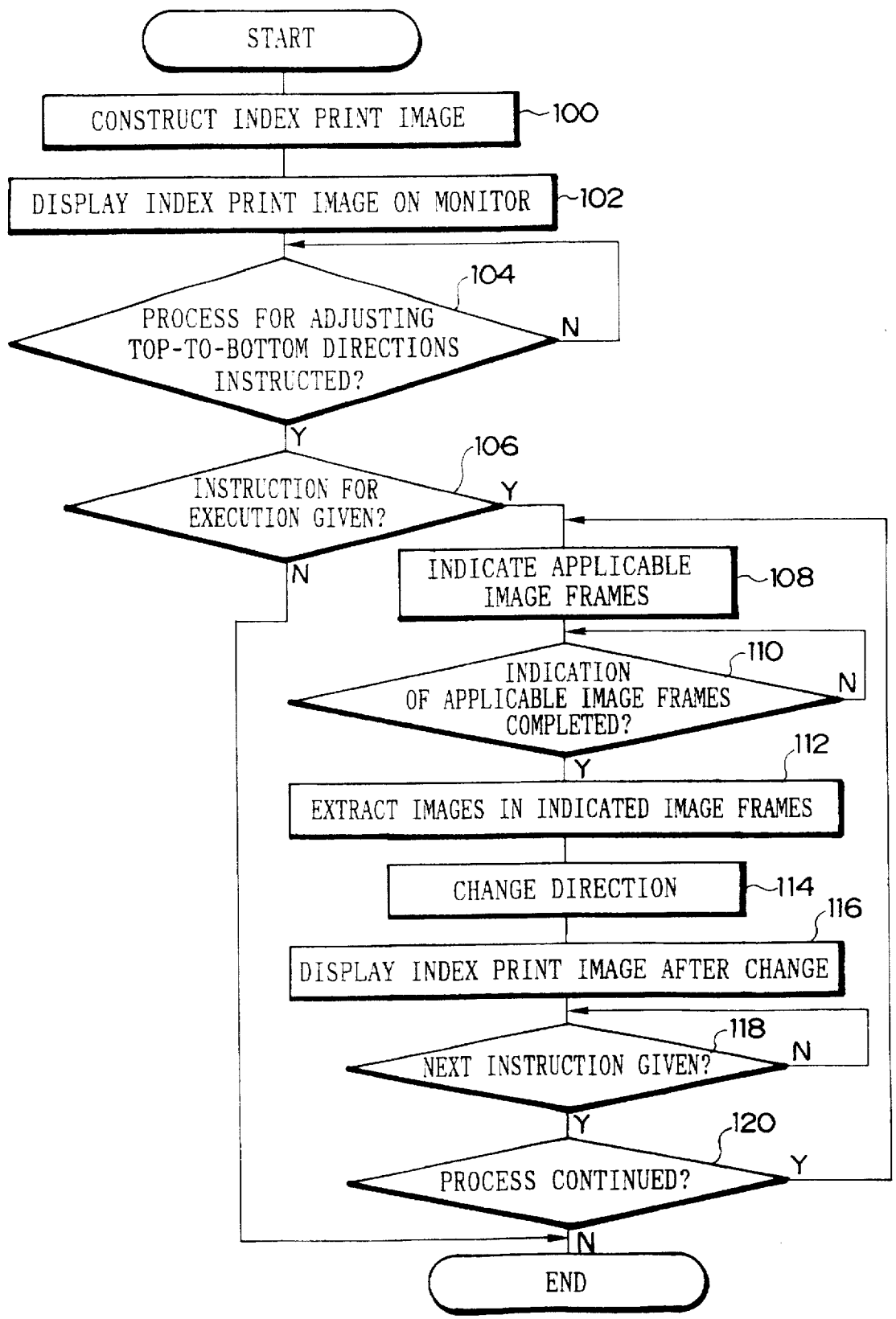
FIG. 4 shows a flow chart illustrating a process for adjusting top-to-bottom directions according to the embodiment of the present invention.

Next, the process for adjusting top-to-bottom directions in the index printing section 42 will be described with reference to FIG. 4.

When image groups read by the scanner 12 and stored in the negative image storing unit 14 are inputted into the image input section 76, an index print image is constructed from the image groups corresponding to one package of negative film N in step 100.

When the index print image is constructed, the constructed index print image is displayed as a positive image on the monitor 70 in step 102. The index print image is displayed with maintaining directions exactly as they were read with respect to the top-to-bottom direction. Accordingly, the index print image include images having different top-to-bottom directions when they are uniformly located oblongly (see FIG. 3A).

When the index print image is displayed on the monitor 70, it is judged in a step 104 whether or not an instruction to execute or omit the process for adjusting top-to-bottom directions is made. Whether or not the adjustment for the top-to-bottom direction is performed can be designated by using a predetermined key on the keyboard 72. The judgment is negated until any of instructions is made.

If any of the instructions to execute or omit the adjustment for the top-to-bottom direction is given, the judgment is affirmed, and the routine proceeds to a step 106 to judge whether or not the given instruction is an instruction for execution. If there is no necessity to perform the adjustment for the top-to-bottom direction for the displayed index print image, the judgment is negated, and a series of processing is ended.

If the process for adjusting top-to-bottom directions is performed, the routine proceeds to a step 108 to indicate image frames subjected to the adjustment for the top-to-bottom direction. The indication is performed by an operator through the keyboard 72.

When the image frames subjected to the adjustment for the top-to-bottom direction are indicated, it is judged in a step 110 whether or not the indication is completed. The judgment is negated until the process is ended by operating a predetermined indication termination key (execution key). It is noted that an operator can indicate one or more image frames.

When the indication for the adjustment for the top-to-bottom direction is completed, indicated image frames are extracted in a step 112. The direction is changed in a step 114 to adjust the top-to-bottom direction.

After the adjustment for the top-to-bottom direction, an index print image after the change of the direction is displayed on the monitor 70 again in a step 116.

When the index print image after the change is displayed on the monitor 70, it is judged in a step 118 whether or not an instruction for correction or completion is given to the displayed image, and the judgment is negated until the instruction is given. The instruction is made by a predetermined continue key or end key on the keyboard 72.

When any one of instructions to continue or end the process is given to the displayed image, it is judged in a step 120 whether or not the given instruction is an instruction to continue. If it is necessary to continuously perform the adjustment for the top-to-bottom direction, for example, when all images required to undergo the adjustment for the top-to-bottom direction are not indicated in the step 108, an instruction to continue the process is given, and the judgment is affirmed. The routine returns to the step 108 to indicate image frames subjected to the adjustment for the top-to-bottom direction, and the process is repeated.

On the other hand, if an instruction to end the process is given, the judgment is negated, and a series of processing is ended.

Thus the index print is prepared. In the obtained index print, the top-to-bottom direction is unified for each of the vertical and lateral images. Accordingly, a photographer can easily investigate each of the images.

In the first embodiment, the process such as the adjustment for the top-to-bottom direction is performed by using the keyboard 72. However, it is allowable to use another indicating means such as a mouse and a touch screen.

The first embodiment has been described as exemplified by those used in a large laboratory. However, the present invention can be also applied to a small laboratory. In such application, the adjustment for the top-to-bottom direction may be performed by displaying every one frame or by displaying a plurality of frames simultaneously.

In the first embodiment, the image for which the direction should be changed is indicated, the direction is changed by the direction changing section 82, and then the image is displayed on the monitor 70 to make confirmation so that the processing is reliably perform. However, the processing may be advanced rapidly without confirmation after the indication of an image and the change of its direction.

SECOND EMBODIMENT

Next, a second embodiment of the present invention will be described with reference to the drawings.

Figure 5:
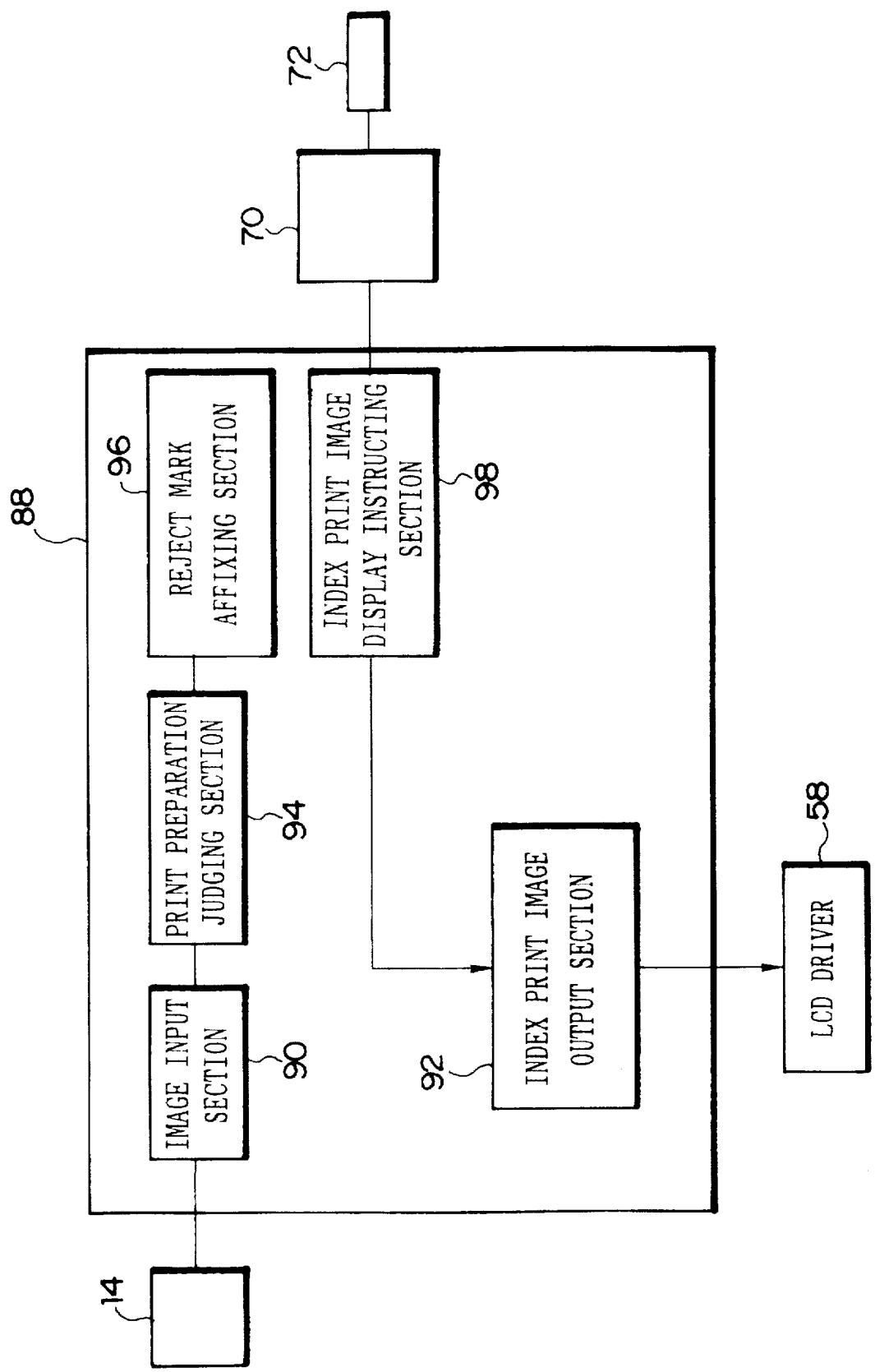
FIG. 5 shows an arrangement of an image processing unit for performing image processing in a second embodiment of the present invention.

FIG. 5 shows an image processing unit 88 used in the second embodiment of the present invention. The image processing unit 88 may be applied to the other components of the image printing apparatus 10 in the first embodiment described above.

Figure 6:
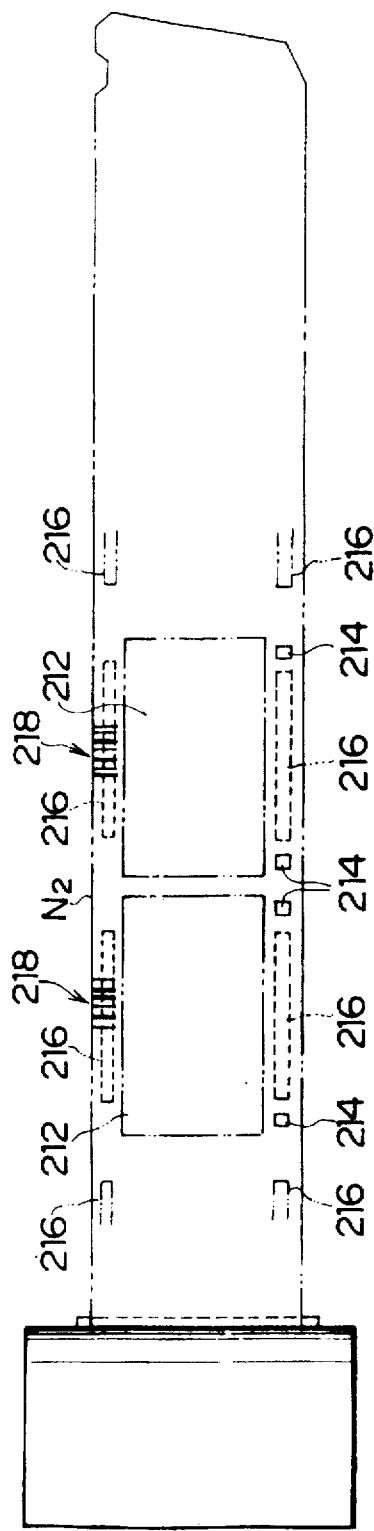
FIG. 6 shows a plan view of a negative film which is applicable to the embodiment of the present invention.

A negative film $N_2$ shown in FIG. 6 may be used in the image printing apparatus 10.

The negative film $N_2$ is provided with a large number of image frames 212 for images to be recorded along a longitudinal direction at a predetermined spacing. The negative film $N_2$ has perforations 214 formed at predetermined first end portions in a widthwise direction in conformity with positions of the respective image frames 212. The position of the image frame 212 can be distinguished by using the perforations.

A magnetic track 216 for recording magnetic information is provided at a position adjacent to the image frame 212 between each of the perforations 214. Various information is recorded on the magnetic track 216, including, for example, information upon photographing operation on the image recorded in each of the image frames 212, print sizes for execution of the printing process, and exposure conditions.

The negative film $N_2$ is affixed with bar codes 218 for recording information such as DX codes, the bar codes 218 being located on a side opposite to the side on which the perforations 214 are formed. The negative film $N_2$ can be specified on the basis of these pieces of information.

Image information of the image frame 212 on the negative film $N_2$ including the magnetic information recorded on the magnetic track 216 is read simultaneously by the scanner 12, which is inputted into the negative image storing unit 14.

The scanner 12 reads all image information in the image frame area on the negative film $N_2$, and outputs it to the negative image storing unit 14.

As shown in FIG. 5, the image processing unit 88 is provided with an image input section 90 for inputting information from the negative image storing unit 14, and an index print image output section 92 for outputting an index print image after completion of image processing to the liquid crystal panel driver 58. Various processing sections for constructing the index print image by using information in all image frame areas on the negative film $N_2$ are provided between the image input section 90 and the index print image output section 92.

Next, a process for classifying image frame groups in the index printing section 42 in the second embodiment will be described.

A print preparation judging section 94 connected to the image input section 90 judges the presence or absence of print preparation for images in all image frame areas on the negative film $N_2$ inputted into the image input section 90 to classify image frames 212 subjected to print preparation (print-prepared image group) and image frames 212 not subjected to print preparation (print-unprepared image group). The criteria for judgment used herein is the same criteria as that used in the main printing section 20 to judge whether or not a print is prepared. Accordingly, all image frames 212 on the negative film $N_2$ are classified into the print-prepared group and the print-unprepared group.

The print preparation judging section 94 is connected to a reject mark affixing section 96. With respect to the two groups classified by the print preparation judging section 94, marks for indicating that no print is prepared (reject mark 99 (see FIG. 7)) are affixed to those included in the print-unprepared group. The reject mark 99 is not affixed to those included in the print-prepared group because prints are prepared.

Reject messages 97 (see FIG. 7) are presented for those included in the print-unprepared group in addition to the reject marks 99. The reject message indicates a reason for preparing no print, for which several patterns are previously prepared, including, for example, "not photographed", "fogging", "out of focus", and "under". The reject message 97 is recorded on the magnetic track 216 on the negative film $N_2$. The reject message 97 is selected by the print preparation judging section 94 in conformity with the reason of judgment to prepare no print.

The reject mark affixing section 96 is connected to an index display instructing section 98. The index print display instructing section 98 constructs an index print image by arranging, in a matrix, images in all image frames 212 on the negative film $N_2$ classified into the print-prepared group and the print-unprepared group respectively, and it makes instruction so that the constructed index print image is displayed on the monitor 70 connected to the image processing unit 88.

Accordingly, a group of images including a predetermined number of image frames 212 are displayed on the display plane of the monitor 70 so that one index print is constructed. Among the image frames 212, the reject marks 99 is displayed for images included in the print-unprepared group. Thus it is recognizable which image frame 212 is printed, or which image frame 212 is not printed.

The index display instructing section 98 is connected to the index print image output section 92. The index print image displayed on the monitor 70 is outputted to the liquid crystal panel driver 58 through the index print image output section 92, and it is displayed on the liquid crystal panel 56 on the optical axis L2.

Figure 7:
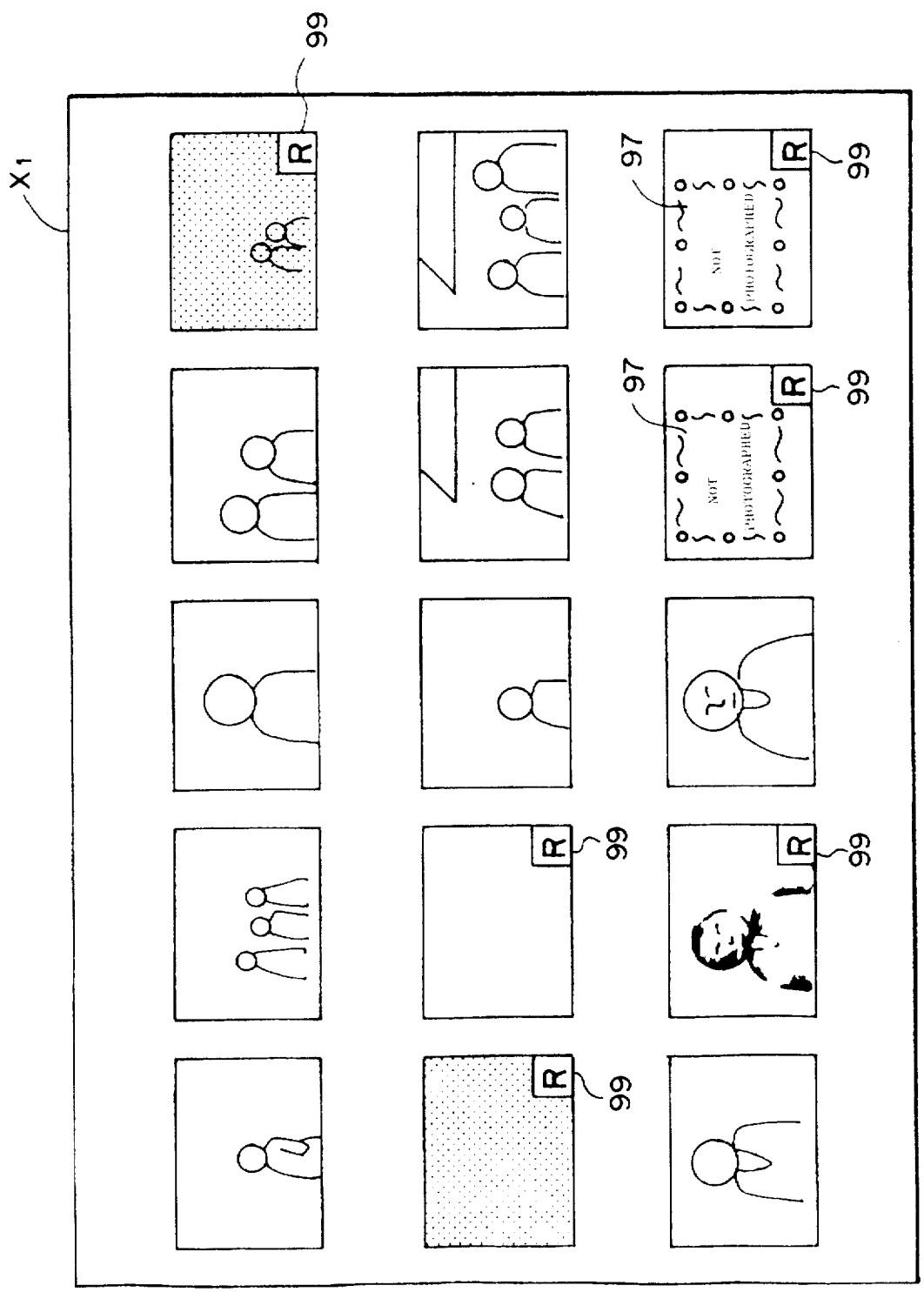
FIG. 7 shows an example of an index print image according to the second embodiment of the present invention.

FIG. 7 shows an index print image $X_1$ as an example of the index print image displayed on the monitor 70.

The reject marks 99 indicated by a character of "R (reject)" is affixed to lower right corners of images located at a right end position in an upper row, a left end position and a second position from a left end in an intermediate row, and second, fourth, and fifth positions from a left end in a lower row. Accordingly, it is recognizable that prints are prepared for the other images not affixed with the reject mark 99.

The reject message 97 indicated by characters of "not photographed" is affixed to the images located at the fourth and fifth positions from the left end in the lower row, in addition to the reject mark 99. The fact that these image frames are not subjected to photographing operation is recorded on the magnetic track 216, which can be alternatively judged by measuring the transmitting density of the image frame 212. Accordingly, it is recognizable that no print is prepared because no image is recorded on these image frames 212.

According to the procedure as described above, when images located in all image frame areas on the negative film $N_2$ are inputted into the image processing unit 88 through the negative image storing unit 14, the presence or absence of print preparation is judged for the image in each of the image frames 212, and the images in all of the image frames 212 are displayed on the monitor 70. The reject mark 99 for indicating the absence of preparation is affixed to the image group not subjected to print preparation, and it is displayed. The reject message 97 is affixed to predetermined image frames 212, and it is displayed, in addition to the reject mark 99.

Figure 8:
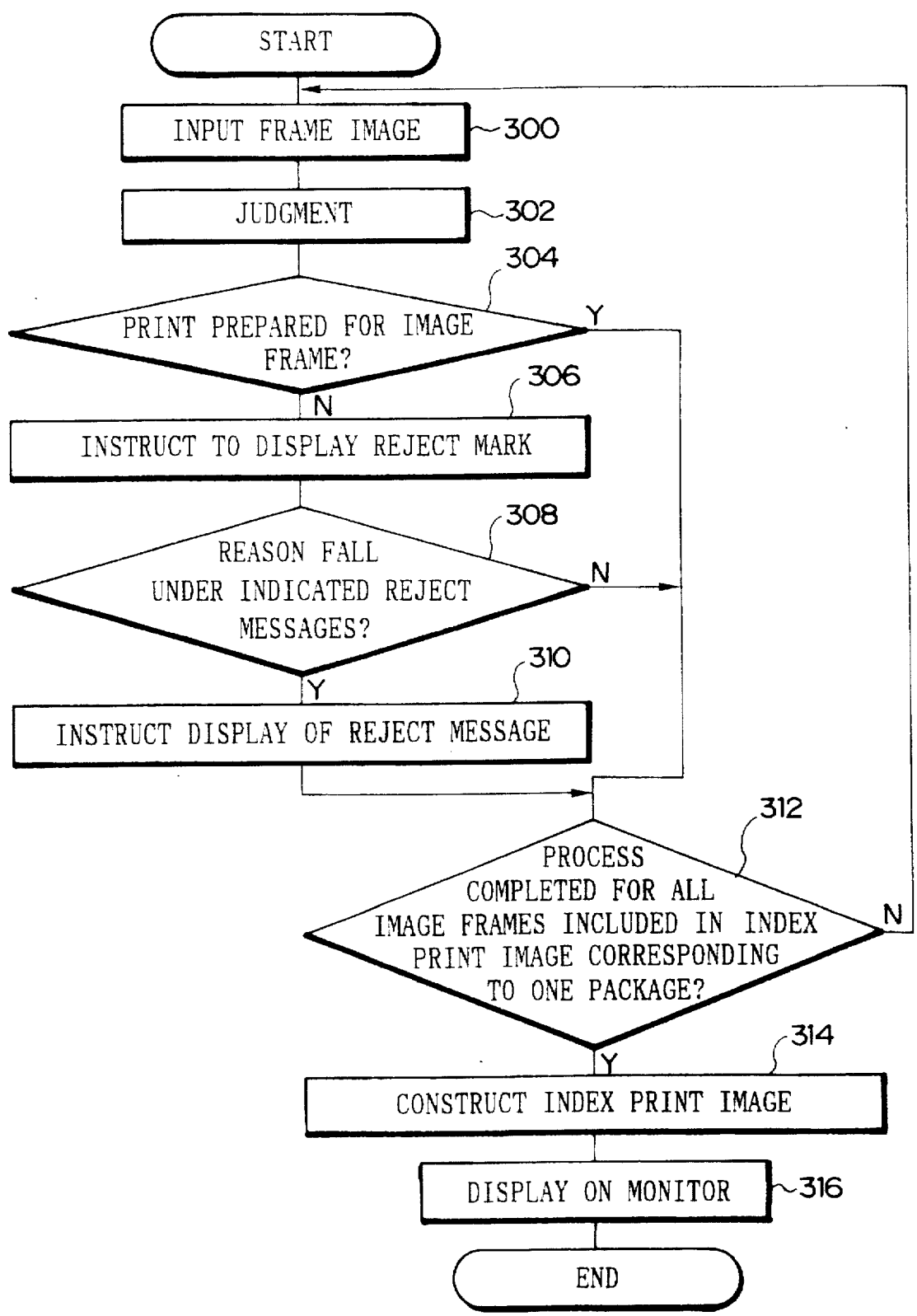
FIG. 8 shows a flow chart illustrating a process for classifying image frames according to the embodiment of the present invention.

Next, the operation of the second embodiment will be described. Operations other than the process for classifying images in the image processing unit 88 are the same as those in the first embodiment, which will be omitted. The process for classifying images in the image processing unit 88 will be described below with reference to FIG. 8.

When image information (including information on no photographing operation) on all image frames 212 on the negative film N₂ is stored in the negative image storing unit 14, the image information on image frames is inputted from the negative image storing unit 14 into the image processing unit 88 for all of the image frames 212 on the negative film N₂ in a step 300.

When the image information on the image frames 212 is inputted, it is judged in a step 302 whether or not prints are prepared for the image frames 212 on the basis of a predetermined criteria. The predetermined criteria refers to all conditions under which a sufficient print is obtained by exposure printing for an applicable image frame 212 in the main printing section 20 along with the optical axis L1.

After the judgment is made, it is judged in a step 304 whether or not each of the image frames 212 is an image frame 212 for which a print is prepared.

The judgment is negated for the image frame 212 for which no print is determined to be prepared as a result of the judgment in the step 302, and the routine proceeds to a step 306.

In the step 306, it is instructed to display the reject mark 99 on an image plane of an applicable image frame 212. In a step 308, it is judged whether or not the reason of no printing falls under any one of the previously designated reject messages. The reject messages include, for example, "not photographed", "out of focus", "under", and "over".

When these reject messages are applicable, the judgment is affirmed, and the routine proceeds to a step 310. It is instructed to display an applicable reject message together, and the routine proceeds to a step 312.

On the other hand, when no reject message is applicable in the step 308, the routine proceeds to the step 312 without receiving instruction for making other displays, in the same manner as the case in which a print is prepared for an image frame 212 in the step 304.

In the step 312, it is judged whether or not the process for classifying image frames is completed for a predetermined number of all image frames 212 for constructing an index print image corresponding to one package. If the process is not completed, the routine returns to the step 300 to input other frame images.

On the other hand, if the process is completed for all image frames 212, the index print image is constructed in a step 314 by using the predetermined number of the image frames 212. In a step 316, it is instructed to display the constructed index print image on the monitor 70, and the process is ended. In the index print image displayed in this step, the reject mark 90 is affixed to those included in the image group not subjected to printing. If applicable, the reject message is also affixed in the index print image (see FIG. 7).

As described above, the index print image is constructed by using the image information on all of the image frames 212 on the negative film N₂. Accordingly, one index print can include the contents of prints as well as the contents of the image frames on the negative film N₂ for constructing the index print. Thus a photographer can easily collate the contents of the prints with the contents of the image frames.

In the second embodiment, the reject mark 99 is affixed when no print is prepared. However, a similar mark (print mark) may be affixed to image frames 212 for which prints are prepared. Alternatively, only print marks may be affixed without using the reject marks 99. Even in such procedures, the same effect can be obtained. The mark is preferably affixed to those for which no print is prepared because image frames 212 for which prints are prepared can be displayed entirely.

The second embodiment has been described by using the negative film N₂ having the magnetic recording layer. However, the present invention can be carried out in the same manner even when an ordinary negative film having no magnetic recording layer is used. In such a case, the reason of judgment to prepare no print may be used as it is.

The second embodiment has been described as exemplified by those used in a large laboratory. However, the present invention can be also applied to a small laboratory in which the negative films N₂ are treated one by one, in the same manner as the first embodiment.

As described above, according to the present invention, it is possible to provide the method for preparing index prints and the apparatus for preparing index prints in order to prepare an index print in which the contents of photographic film can be easily collate with the contents of prints.

What is claimed is:

1. A method for preparing index prints, comprising:

arranging image frames recorded on a photographic film into a matrix form, each of the image frames having a respective orientation;

displaying the image frames on a display means to provide a displayed image;

classifying each of said image frames as one of a vertical image frame and a lateral image frame;

making the respective orientation of all said vertical image frames identical in the displayed image;

making the respective orientation of all said lateral image frames identical in the displayed image; and exposing the displayed image onto a photosensitive material.

2. An apparatus for preparing index prints by arranging image frames recorded on a photographic film into a matrix form to display on an image display means and exposing the displayed image onto a photosensitive material, said apparatus comprising:

image storing means for reading and storing image information on image frames on the photographic film;

index print constructing means for constructing an index print image on the basis of the image information stored in the image storing means;

a monitor for temporarily displaying the index print image constructed by the index print constructing means;

direction indicating means for indicating a direction of each image frame displayed on the monitor upon preparation of the index print; and control means for controlling display of the images on the image display means on the basis of an indication made by the direction indicating means.

3. A method for preparing index prints, comprising:

arranging image frames recorded on a photographic film into a matrix form to produce a matrix image, the image frames each having respective print information;

exposing the matrix image onto a photosensitive material to produce an index print and recording the respective print information for each of the image frames in the index print, the respective print information indicating the presence or absence of said each image frame.

4. A method according to claim 3, further comprising:

the print information being recorded on a magnetic recording layer provided on the photographic film, and recording the print information on each of the image frames in the index print by reading the print information from the magnetic recording layer.

5. A method according to claim 3, further comprising:

classifying each of the image frames recorded on the photographic film as one of a vertical image frame and a lateral image frame;

making a respective vertical orientation of each said vertical image frame coincident; and making a respective horizontal orientation of each said lateral image frame coincident.

6. An apparatus according to claim 2, wherein the control means controls the image display means to display the print information including at least the presence or absence of respective print on each image frame in the index print.

7. An apparatus according to claim 6, wherein the print information is recorded on a magnetic recording layer provided on the photographic film, and the print information is displayed on each image frame in the index print by reading the print information from the magnetic recording layer.

* * * * *